United States Patent [19]

Jödden et al.

[11] 4,278,647
[45] Jul. 14, 1981

[54] PRODUCTION OF PHOSPHOROUS ACID

[75] Inventors: Klaus Jödden, Hürth; Hans-Werner Stephan, Cologne; Gero Heymer, Erftstadt, all of Fed. Rep. of Germany

[73] Assignee: Hoechst Aktiengesellschaft, Fed. Rep. of Germany

[21] Appl. No.: 60,659

[22] Filed: Jul. 25, 1979

[30] Foreign Application Priority Data

Jul. 29, 1978 [DE] Fed. Rep. of Germany ....... 2833380

[51] Int. Cl.$^3$ ...................... C01B 25/16; C01B 25/26
[52] U.S. Cl. ..................................... 423/317; 423/307
[58] Field of Search ............... 423/317, 307, 499, 481, 423/316

[56] References Cited

FOREIGN PATENT DOCUMENTS 1218063 12/1958 France ..................................... 423/317

Primary Examiner—O. R. Vertiz
Assistant Examiner—Gregory A. Heller

[57] ABSTRACT

The invention relates to a process for making aqueous phosphorous acid solutions by admixing an aqueous sodium phosphite solution with hydrochloric acid. More specifically, phosphorous acid solutions substantially free from sodium in hydrochloric acid are produced by introducing hydrogen chloride, into the sodium phosphite solution until the latter is saturated therewith and separating precipitating sodium chloride from the resulting phosphorous acid solution in hydrochloric acid.

8 Claims, No Drawings

PRODUCTION OF PHOSPHOROUS ACID

This invention relates to a process for making aqueous phosphorous acid solutions by admixing an aqueous sodium phosphite solution with hydrochloric acid.

In the continuous production of hydrogen phosphide by subjecting white phosphorus to disproportionation with the use of a sodium hydroxide solution, considerable quantities of aqueous sodium phosphite solutions, which commonly contain small proportions of sodium hypophosphite, are invariably obtained. These are solutions which generally present an overall content of phosphorus of 1 to 12 weight %, the ratio of $P^{1+}:P^{3+}$ being equal to about 0.1 to 0.3.

For reasons of environmental protection and price, it is necessary for these waste liquors to be worked up. The only phosphite salt of commercial interest is basic lead phosphite which finds use as a stabilizer for polyvinyl chloride. In addition to this, it is basically possible to make commercial use of phosphite/hypophosphite-solutions by spraying crude phosphate thereonto so as to recover elementary phosphorus. It has also been suggested that phosphites should be subjected to pyrolytic treatment for conversion to phosphates.

These prior art methods are, however, not fully satisfactory inasmuch as relatively expensive low valency phosphorus compounds are converted to commercially less valuable phosphates or even used in conjunction with crude phosphate only.

It is therefore an object of the present invention to provide a process permitting effective use to be made of the above waste liquors while maintaining the phosphorus, which is contained therein, in the trivalent oxidation stage.

To this end, we provide a process, wherein hydrogen chloride is introduced into a sodium phosphite solution until the latter is saturated therewith and precipitating sodium chloride is separated from the resulting solution of phosphorous acid in hydrochloric acid.

It is generally known in the art that a strong mineral acid which is added to a salt solution of a relatively weak acid enables the weak acid to be set free from its salt. Despite this, the saturation of a sodium phosphite solution with hydrogen chloride would not have been expected to result in the substantially quantitative precipitation and separation of the sodium in the form of sodium chloride inasmuch as this has turned out to be impossible in connection with the corresponding potassium compounds. Also, it is not possible by the use of a hydrogen halide other than hydrogen chloride, e.g. hydrogen bromide, to produce the results of the present invention.

The phosphorous acid solution in hydrochloric acid which is obtained in the present process can be concentrated by evaporation and subjected to stripping so as to recover phosphorous acid therefrom. More preferably, however, the solution should be used as water of hydrolysis in the production of $H_3PO_3$ from $PCl_3$.

The sodium phosphite solutions which are used in the present process contain 1 to 12 weight%, preferably 7 to 10 weight%, of phosphorus and 1 to 50 weight%, preferably 15 to 25 weight%, of sodium, calculated as sodium hydroxide.

The sodium phosphite solution should preferably be saturated with hydrogen chloride at room temperature. In those cases in which the particular sodium phosphite solution contains hypophosphites which are liable to adversely affect the work up of the resulting phosphorous acid solution, it is good practice, prior to the introduction of hydrogen chloride, to pass a free oxygen-containing gas, e.g. air or oxygen, through the sodium phosphite solution at elevated temperature, preferably at boiling temperature.

It is generally known in the art that use can be made of a catalytically active metal, such as platinum, palladium, copper or Raney nickel, for oxidizing an aqueous hypophosphite solution while hot to obtain phosphite, hydrogen being evolved during the oxidation. The operation just described is, however, not satisfactory inasmuch as use is made therein of a solid phase which makes it necessary to employ an additional filtration step and which renders continuous operation difficult.

In accordance with the present invention, we have found that it is possible for the small proportions of hypophosphite which is contained in the sodium phosphite solution to be oxidized while hot to phosphite just with the use of air or oxygen without the phosphite being liable to undergo further oxidation to phosphate. The solution treated as disclosed in this invention can directly be converted to a phosphorous acid solution.

As already indicated above, it is possible to use the resulting phosphorous acid solution for the pyrolysis of $PCl_3$. A further beneficial effect of the present process resides in the fact that hydrogen chloride, which is a by-product obtained in the pyrolysis of $PCl_3$, can be used for the conversion of sodium phosphite solutions to phosphorous acid solutions. In other words, the present process adds to improving the plant capacity in the production of phosphorous acid substantially in the absence of increased chloride formation. Last but not least, the present process enables sodium phosphite waste liquor to be converted to phosphorous acid solution, which is an intermediate product considerably more valuable than phosphates and contains unexpectedly small proportions of sodium that are not liable to interfere with its widespread uses.

EXAMPLE 1

500 ml of a sodium phosphite solution, which contained 0.7 weight % of P in the form of hypophosphite, 7.4 weight % of P in the form of phosphite and 0.1 weight % of P in the form of phosphates was heated to boiling over 2 hours while air was introduced into the solution. After this had been done, the hypophosphite content was found to have been reduced to less than 0.1 weight %.

Next, the sodium phosphite solution was admixed with a quantity of water sufficient to dissolve precipitated salts and re-establish its initial concentration. By means of a dropping funnel, the diluted solution was introduced within 1 hour into a scrubbing tower which was provided with a cooling jacket and packed with Raschig rings, and into which hydrogen chloride (250 l/h) was introduced countercurrently with respect to the solution. Precipitated sodium chloride magma, which was collected in an intermediate vessel provided with a filter cloth bottom, was filtered under slight overpressure. A portion of clear filtrate was continuously pumped into the scrubbing tower for mechanically scrubbing down NaCl-magma. Once a NaCl-layer several cm thick was found to have been formed on the filter cloth, sodium chloride was removed from the filter by means of water.

The filtrate contained 22.8 weight % of $H_3PO_3$ and 0.029 weight % of $Na_2O$, or 940 ppm, based on $H_3PO_3$. The filtrate was directly used for hydrolyzing $PCl_3$.

EXAMPLE 2

Hydrogen chloride (40 l/h) was introduced at room temperature while cooling into 500 g of a sodium phosphite solution which contained altogether 9.3 weight % of P and 17.3% of $Na_2O$. After saturation, 176 g of sodium chloride was separated and solution with 22.4 weight % of $H_3PO_3$ and 0.038 weight % of $Na_2O$ was obtained.

We claim:

1. A process for making an aqueous phosphorous acid solution containing hydrochloric acid which comprises saturating an aqueous sodium phosphite solution with hydrogen chloride and separating precipitating sodium chloride from the reaction product with the resultant formation of a phosphorous acid solution containing hydrochloric acid, said phosphorus acid solution being substantially free from sodium chloride.

2. A process for making phosphorous acid which comprises saturating an aqueous sodium phosphite solution with hydrogen chloride and separating precipitating sodium chloride from the reaction product with the resultant formation of a phosphorous acid solution containing hydrochloric acid, said phosphorous acid solution being substantially free from sodium chloride, stripping said solution and recovering the phosphorous acid.

3. The process as claimed in claims 1 or 2, wherein the sodium phosphite solution contains 1 to 12 weight % of phosphorus.

4. The process as claimed in claims 1 or 2, wherein the sodium phosphite solution contains 7 to 10 weight % of phosphorus.

5. The process as claimed in claims 1 or 2, wherein the sodium phosphite solution is saturated with hydrogen chloride at room temperature.

6. The process as claimed in claims 1 or 2, wherein a free oxygen containing gas is passed at elevated temperature through the hypophosphite containing sodium phosphite solution, prior to introducing hydrogen chloride thereinto.

7. The process as claimed in claims 1 or 2, wherein the sodium phosphite solution contains 1 to 50 weight % of sodium, calculated as sodium hydroxide.

8. The process as claimed in claim 7, wherein the sodium phosphite solution contains 15 to 25 weight % of sodium, calculated as sodium hydroxide.

* * * * *